June 29, 1954   K. R. CLARK   2,682,142
CUTTER ELEMENT FOR ROTARY MOWERS
Filed March 15, 1951
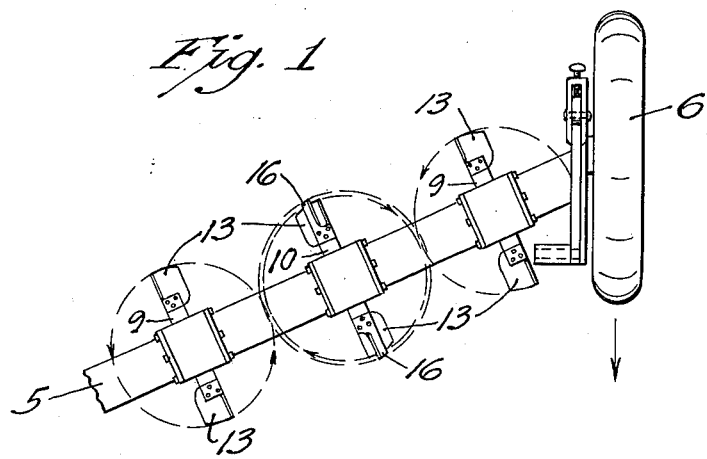
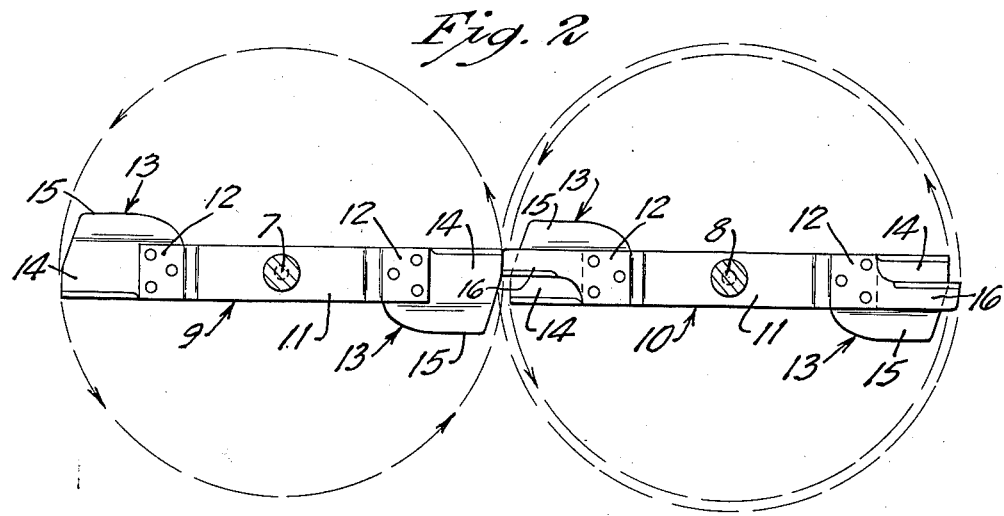
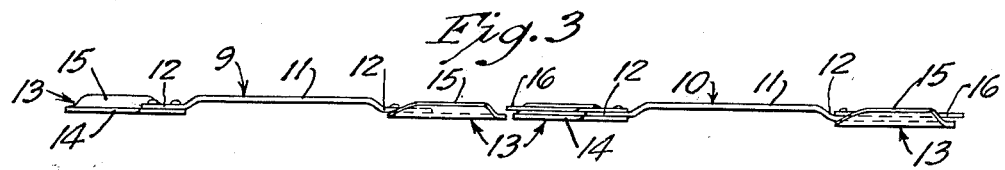
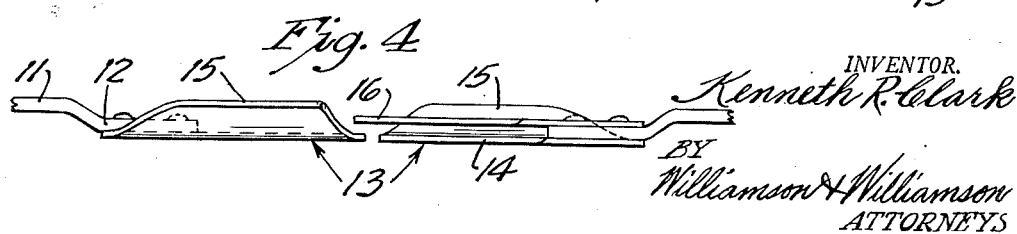
INVENTOR.
Kenneth R. Clark
BY
Williamson & Williamson
ATTORNEYS Patented June 29, 1954

2,682,142

UNITED STATES PATENT OFFICE 2,682,142

CUTTER ELEMENT FOR ROTARY MOWERS

Kenneth R. Clark, Milwaukee, Wis., assignor to Whirlwind, Inc., Milwaukee, Wis., a corporation of Wisconsin Application March 15, 1951, Serial No. 215,797

5 Claims. (Cl. 56—255)

This invention relates to rotary mowers. More particularly, it relates to rotary mowers of the type wherein rotary cutter elements are mounted on a plurality of vertical axes spaced so that the orbits of the cutter elements are in close proximity to each other.

The problem of providing an overlap between the respective cutter elements of a rotary mower has been solved previously in several different ways but none of these structures have proved satisfactory. Some of them leave streaks which are uncut during turning operations. Others leave noticeable differences in height in the mowed surfaces. Others require expensive drive mechanisms to accomplish synchronization of the cutter elements. My invention is directed toward eliminating these unsatisfactory results.

It is a general object of my invention to provide a rotary mower having novel and improved rotary cutter units of cheap and simple construction and mounting and of increased efficiency.

Another object is to provide a rotary mower constructed to provide an overlap between the adjacent orbits of the rotary cutter elements with a minimum of structure, inconvenience and cost.

Another object is to provide a rotary mower constructed to furnish an overlap between adjacent orbits of the rotary cutter elements to produce a mown surface which appears even throughout to the observer.

Another object is to provide a rotary mower constructed to furnish overlap between adjacent rotary cutter units, the results of which is unnoticeable even though the axes are disposed along a line perpendicular to the direction of movement of the mower and even though the cutter units are disposed in the same plane.

Another object is to provide a rotary mower constructed to furnish overlap between adjacent rotary cutters units without requiring mechanism for synchronization of the units or for staggering their arrangement in the direction of movement of the mower.

Another object is to provide a rotary mower having rotary cutter units constructed to provide overlap which will positively preclude the leaving of unmown streaks during turning operations.

These and other objects and advantages of my invention will be more apparent from the following description made in connection with the accompanying drawings, wherein like reference characters refer to similar parts throughout the several views and in which:

Fig. 1 is a top view of a portion of a rotary mower including one embodiment of my invention.

Fig. 2 is an enlarged plan view of a pair of rotary cutter elements mounted adjacent each other and including one embodiment of my invention.

Fig. 3 is a side elevational view of the embodiment shown in Fig. 2.

Fig. 4 is a further enlarged fragmentary side elevational view of the structure shown in Fig. 3 to show the invention in detail.

One embodiment of my invention may include as shown in Figs. 1-4 an ambulant frame indicated generally as 5 being supported by wheel structure 6 for movement across the surface to be mowed. A portion of such a frame is shown in Fig. 1. Mounted on this frame for rapid rotation on spaced vertical axes 7 and 8 is at least a pair of rotary cutter unit assemblies 9 and 10. Each of the vertical shafts 7 and 8 are adapted to be connected to a source of rotary power (not shown). As best shown in Fig. 2 the shafts 7 and 8 are spaced so that the orbits of the two cutter unit assemblies are in close proximity to each other. It is understood of course that as many of these assemblies as is desired may be constructed and used in the manner to be hereinafter described.

Secured to the lower end portions of the vertical shafts 7 and 8 for rapid rotation therewith and at a level above the surface of the ground at which the grass is to be mowed are the two rotary cutter unit assemblies. The rotary cutter unit assembly 9 is comprised of a knife holder 11 which is elongated and has its outer end portions 12 adapted to removably receive a knife element 13. As best shown in Fig. 2, each of the end portions 12 of the knife holder 11 are so adapted as to carry a knife element 13. The forward or leading edge 14 of the knife element 13 is sharpened and the rearward or trailing portion 15 is upturned to create during rotation an upwardly directed air current.

The rotary cutter unit assembly 10 is quite similar to the assembly 9 in that it includes a knife holder 11 with end portions 12 carrying on its lower surface a knife element 13. The knife element 13 has its leading edge 14 sharpened and its trailing edge 15 upturned similarly to those included in the assembly 9. In addition however, I have added a second and longer knife element 16, this knife element being secured to the upper surface of the end portions 12 and extending outwardly therefrom to a point beyond the orbit of the knife elements 13 of the adjacent assembly 9. This structure is best shown in Fig. 4. It should be noted that the knife elements 13 of the respective assemblies 9 and 10 are disposed in substantially the same plane while the knife element 16 is disposed at a level slightly above each of the other knife elements. The leading edge of the knife element 16 is, of course, sharpened. The outer end portion of this knife 16 overlaps the free area between the adjacent assemblies 9 and 10 and extends slightly beyond the orbit of the assembly 9. If desired, of course, additional assemblies may be used with every other one of the assemblies being provided with the additional knife 16 constructed and arranged as best shown in Fig. 4.

In operation, the assemblies 9 and 10 are rotated at high speed. The knife elements 13 will effectively cut the grass and weeds encountered thereby and their upturned trailing edges 15 will create an upwardly directed air current to maintain the grass to be mown in an erect position, thereby accomplishing a more effective mowing operation. The knife element 16 will effectively cut the grass which would normally be missed by the knife elements 13 in the free area therebetween to provide a mown surface which appears uniform throughout to observers. Although the knife element 16 is disposed at a level slightly above the knife elements 13 this difference is not noticeable to an observer so long as the vertical distances between such knife elements is maintained at a minimum as shown in Fig. 4. In other words, to an observer a surface mown by a rotary mower including my invention will appear to be even and smooth throughout.

Thus it can be seen that I have provided a rotary cutter unit assembly of cheap and simple construction and of improved efficiency. There is no possibility of a rotary mower leaving streaks or unmown areas between the adjacent cutter units during turning operations when utilizing my cutter unit assemblies. There is also no need for complicated and expensive mechanisms for synchronizing knife elements which overlap. In addition, there is no need for complicated structure for staggering the positions of cutter assemblies with respect to a line extending transversely across the rotary mower and there are no uneven mown areas resulting from cutter unit assemblies disposed at different elevations.

It will of course be understood that various changes may be made in the form, details, arrangement and proportions of the parts without departing from the scope of my invention.

What I claim is:

1. In a rotary mower, the combination of an ambulant frame, at least a pair of elongated rotary cutter units mounted on said frame for revolution in substantially the same plane and on spaced vertical axes extending transversely of their length, said cutter units being adapted to be connected to a source of rotary power and being disposed so that their respective orbits are in close proximity to each other, at least one of said cutter units including at least a pair of vertically but closely spaced knife elements secured to its outer end and defining its orbit, and one of said knife elements extending outwardly beyond the orbit of the adjacent cutter unit but in a different plane to provide effective overlap between the cutter units.

2. In a rotary mower, the combination of an ambulant frame, at least a pair of rotary cutter units mounted for revolution in exactly the same plane and in non-overlapping relation on spaced vertical axes, and means for revolving said cutter units at high speeds, said cutter units being disposed so that their respective orbits are in close proximity with each other, at least one of said cutter units having at least a pair of vertically but closely spaced knife elements secured to its outer end, one of said knife elements extending outwardly beyond the orbit of the adjacent cutter unit in non-cooperating relation with said adjacent cutter-unit and in a different plane to provide effective overlap between the cutter units.

3. In a rotary mower having spaced vertical rotary axes for the rapid rotation of cutter units on the lower end portion thereof, a cutter unit assembly including an elongated knife holder adapted to be connected with the lower end portion of one of the axes for rotation therewith in a substantially horizontal plane, a knife element carried by the outer end portion of said knife holder, and a second knife element carried by said knife holder in vertically spaced relation to said first mentioned knife element and extending outwardly away from the axis of the knife holder to a point beyond said first mentioned knife element to provide effective overlap with adjacent cutter units having knife elements passing in close proximity to and in substantially the same plane as said first mentioned knife element without cooperating with said adjacent cutter units.

4. In a rotory mower having spaced vertical rotary axes for the rapid rotation of cutter units on the lower end portion thereof, a cutter assembly comprising an elongated knife holder adapted to be connected at its medial portion with the lower end portion of one of the axes for rotation therewith in a substantially horizontal plane, a pair of knife elements mounted on the opposite end portions of said knife holder in the same horizontal plane, each of said knife elements having its leading edge sharpened and its rearward portion upturned to create during rotation of the knife holder an upwardly directed air current, and a second pair of knife elements mounted on the opposite end portions of said knife holder in vertically spaced relation to its respective first mentioned knife element and extending outwardly therebeyond with respect to the axis of rotation to provide effective overlap with respect to adjacent rotating cutter units having knife elements passing in close proximity to and in the same plane as said first mentioned knife elements, said second pair of knife elements being positioned in non-cooperating relation to the knife elements of adjacent cutter units.

5. In a rotary mower, the combination of an ambulant frame; at least a pair of rotary cutter units mounted adjacently for revolution in exactly the same plane and on spaced vertical axes; and means for revolving said cutter units at high speeds, said cutter units being disposed so that their respective orbits are in close proximity to each other, each of said cutter units including an elongated knife holder connected at its medial portion with the lower end portion of one of the axes for rotation therewith in a horizontal plane and including a pair of knife elements mounted on the opposite end portions of said knife holder and extending in the same horizontal plane, each of said knife elements having its leading edge sharpened and its rearward portion turned upwardly to create an upwardly directed air current while said knife holder rotates, and at least one of said cutter units including a second pair of knife elements mounted on the opposite end portions of said knife holder in vertically spaced relation to its respective first mentioned knife element and extending outwardly therebeyond with respect to the axis of rotation to a point beyond the outer end of said first mentioned knife element on the adjacent rotating cutter unit but in non-cooperating relation thereto to provide effective overlap with respect to the adjacent cutter unit.

References Cited in the file of this patent

UNITED STATES PATENTS

| Number | Name | Date |
|---|---|---|
| 13,205 | Barrett | July 10, 1855 |
| 1,054,256 | Taylor | Feb. 25, 1913 |
| 1,317,212 | Montague | Sept. 30, 1919 |
| 1,467,279 | Montague | Aug. 21, 1923 |
| 1,656,105 | Durkee | Jan. 10, 1928 |
| 1,710,749 | Svendsgaard | Apr. 30, 1929 |
| 2,474,557 | Templeton | June 28, 1949 |
| 2,547,540 | Roberts | Apr. 3, 1951 |
| 2,550,144 | Flintjer | Apr. 24, 1951 |